United States Patent [19]

Krutak et al.

[11] Patent Number: 5,102,980
[45] Date of Patent: Apr. 7, 1992

[54] COLORED POLYESTER COMPOSITIONS

[75] Inventors: James J. Krutak; Max A. Weaver; Clarence A. Coates; William W. Parham; Terry A. Oldfield; Wayne P. Pruett, all of Kingsport; Samuel D. Hilbert, Jonesborough, all of Tenn.

[73] Assignee: Eastman Kodak Company, Rochester, N.Y.

[21] Appl. No.: 679,819

[22] Filed: Apr. 1, 1991

Related U.S. Application Data

[63] Continuation of Ser. No. 612,018, Nov. 13, 1990, abandoned.

[51] Int. Cl.5 .............................................. C08G 63/20
[52] U.S. Cl. .................................... 528/272; 528/290; 528/295; 528/298; 528/302; 528/308; 528/308.6; 525/448; 525/535; 525/537; 525/540; 524/88; 524/174
[58] Field of Search ............... 528/272, 290, 295, 298, 528/302, 308, 308.6; 525/448, 535, 537, 540; 524/88, 174

[56] References Cited

U.S. PATENT DOCUMENTS

| 2,219,330 | 10/1940 | Nadler et al. | 260/314 |
|---|---|---|---|
| 3,053,850 | 9/1962 | Clark et al. | 260/314.5 |
| 4,039,467 | 8/1977 | Tucker | 252/300 |
| 4,267,306 | 5/1981 | Davis et al. | 528/226 |
| 4,330,469 | 5/1982 | Gati et al. | 540/126 |
| 4,359,570 | 11/1982 | Davis et al. | 528/289 |
| 4,403,092 | 9/1983 | Davis et al. | 528/290 |
| 4,732,615 | 3/1988 | Kawashita et al. | 106/22 |

FOREIGN PATENT DOCUMENTS

| 307275 | 12/1988 | Japan . |
| 784843 | 10/1957 | United Kingdom . |
| 883807 | 12/1961 | United Kingdom . |

OTHER PUBLICATIONS

Chem. Abstracts, vol. 46, (1963), p. 5298.
Chem. Abstracts, vol. 46, (1963), p. 10849.
Chem. Abstracts, vol. 63, (1965), p. 7150.
Chem. Abstracts, vol. 64, (1966), p. 2205.
Brodman, Revista de Chemie, vol. 17, Issue No. 2, (1960), pp. 74–77.

Primary Examiner—John Kight, III.
Assistant Examiner—Sam A. Acquah
Attorney, Agent, or Firm—Bernard J. Graves, Jr.; William P. Heath, Jr.

[57] ABSTRACT

Provided are novel polyester compositions containing copper phthalocyanine sulfonamide colorants copolymerized therein. Also provided are amorphous color concentrates, partially-crystalline color concentrates and semi-crystalline color concentrates. These polyester compositions are particularly useful for use as colored packaging materials and for colorants for personal, medical, and home care products where non-extractability of the colorant residue is important.

39 Claims, No Drawings

COLORED POLYESTER COMPOSITIONS

This is a continuation of copending application Ser. No. 07/612,018 filed on Nov. 13, 1990, now abandoned.

FIELD OF THE INVENTION

This invention belongs to the field of polyester chemistry. More particularly, this invention relates to polyester compositions having copper phthalocyanine sulfonamide residues copolymerized therein.

BACKGROUND OF THE INVENTION

It is known to color polyester compositions useful for packaging materials by using copper phthalocyanine (C. I. Pigment Blue No. 15) added at low levels with copolymerizable red and/or yellow anthraquinone compounds to produce amber and green bottles. See, for example, U.S. Pat. Nos. 4,359,570, and 4,267,306. However, under certain conditions, the copper phthalocyanine colorant is extractable. Also, problems of poor compatibility, poor final polymer properties, nonuniformity, and reduced clarity are encountered in compositions where the nonreactive pigment is added at high levels.

U.S. Pat. No. 4,403,092 teaches blue anthra. quinone derived colorants which contain polyester reactive groups to produce a polyester composition having copolymerized nonextractable blue colorants therein; however, these compounds have poor fastness to light in general and are not suitable for use in applications when exposure to prolonged sunlight is a concern. Furthermore, none of the known thermally stable anthraquinone blues are suitable as "cyan" colorants for use in a trichromatic color system consisting of cyan, magenta and yellow colorants because of the broad absorption bands in their visible spectra. (See for example, N. Ohta, Photographic Science and Eng., Vol. 15, No. 5, Sept.-Oct., 1971, pp. 399–415.)

SUMMARY OF THE INVENTION

This invention relates to polyester compositions which contain copper phthalocyanine sulfonamide colorants copolymerized therein, wherein said colorants consist of unsubstituted and substituted copper phthalocyanine residues linked to an organic moiety which contains at least one polyester reactive group via a sulfonamide linking group, wherein said organic moiety consists of unsubstituted or substituted aliphatic, cycloaliphatic or aromatic moieties or combinations thereof. These polyester compositions are particularly suitable for use as packaging materials and for colorants for personal, medical, and home care products where nonextractability of the colorant residue is important.

DETAILED DESCRIPTION OF THE INVENTION

Plastics, paints, printing inks, rubber, cosmetics, e.g., lipsticks, etc., are usually colored by organic colorants when superior brilliance and tinctorial strength are advantageous. Toxicity has been a chronic problem related to the use of these materials as some have been shown to be potential carcinogens and to cause contact dermatitis, for example. (See, for example, Federal Register (July 15, 1988) and ACTA Derm. VENEROL, Suppl. 1987, 134, pp. 95–97.) Plastics usually consist of large macromolecules and other ingredients such as fillers, plasticizers, colorants, etc. Most polymers do not produce allergic reactions by themselves, but leachable additives are known to cause contact dermatitis. (See, for example, S. Fregert; Manual of Contact Dermatitis, Munksgard, Denmark, 2nd Ed. 1981.) It is one aspect of this invention to provide colored polymeric compositions which have the colorants incorporated into the polymer chain so that the colorant will not be leachable, sublimable, extractable, or be exuded from the polymer composition. In a further aspect, there are provided microcrystalline polyester materials capable of being formulated into a wide variety of products such as cosmetics, household care products, etc., which will be safe to humans since exposure to toxic molecules readily absorbed by the body is greatly minimized. As can be envisioned, these polymeric compositions have utility in a wide variety of applications where toxicological concerns are evident. The concentrate materials may be used for imparting non-extractable color to a wide variety of thermoplastic compositions including polyesters, polycarbonates, polyamides, cellulose esters, polyurethanes, polyolefins, etc., by conventional melt or solution blending techniques. When using the polymeric color concentrates of this invention, the colorant problems relative to toxicity concerns are overcome.

Certain copolymerizable phthalocyanine colorants which contain copper phthalocyanine residues (Z) linked to an organic moiety containing at least one polyester reactive group via a sulfonamide linking group have been found to be useful for providing colorfast polyester compositions, particularly with regard to nonextractability and fastness to light, thus overcoming both of the deficiencies of the prior art compositions containing blue colorants.

The copper phthalocyanine colorants also produce transparent and highly saturated minus red shades and have light absorption properties which make them particularly desirable as the cyan components in trichromatic color systems based on yellow-magenta-cyan colorants, in contrast to the known anthraquinone derivatives of the prior art.

Thus, the present invention provides a polyester composition having copolymerized therein or reacted therewith at least 0.001 weight percent of a residue of Formula (I)

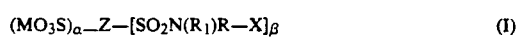

$$(MO_3S)_\alpha - Z - [SO_2N(R_1)R - X]_\beta \quad (I)$$

wherein

Z is a copper phthalocyanine residue, optionally substituted with 1–12 groups selected from $C_1$–$C_{10}$ alkyl, $C_1$–$C_{10}$ alkoxy, $C_1$–$C_{10}$ alkylthio, arylthio, or halo;

M is hydrogen, an alkali metal cation, an ammonium or substituted ammonium cation;

R is a $C_1$–$C_{20}$ divalent organic residue;

X is a group reactive with at least one of the functional groups of the monomers from which the polyester is prepared;

$R_1$ is hydrogen, $C_1$–$C_{10}$ alkyl, $C_1$–$C_{10}$ substituted alkyl, $C_3$–$C_{10}$ cycloalkyl, aryl, or a group of the formula —R—X;

$\alpha$ is 0, 1, or 2; and $\beta$ is 1, 2, 3 or 4, provided that the sum of $\alpha$ plus $\beta$ is equal to or less than 4.

Preferably X is hydroxy, carboxy, carbonyl halide, $C_3$–$C_{10}$ alkenyloxycarbonyl, $C_3$–$C_8$ cycloalkoxycarbonyl, or a group of the formulae

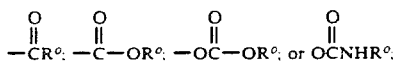

wherein $R^o$ is hydrogen; $C_1$-$C_{10}$ alkyl, $C_1$-$C_{10}$ substituted alkyl; $C_3$-$C_8$ cycloalkyl; phenyl; substituted phenyl; furanyl; or thienyl.

The term "substituted phenyl" as used herein refers to a phenyl group substituted with one or two groups chosen from the group consisting of halogen, hydroxy, cyano, nitro, $C_1$-$C_6$ alkyl, $C_1$-$C_4$ alkoxy, carboxy, carboxymethyl, hydroxymethyl, amino, trihalo methyl and N-methylsulfonylamino. The term "substituted phenoxy" as used herein refers to such substituted phenyl groups attached through a single oxygen atom.

Examples of the term "substituted phenyl" include a mono- or di(halo)phenyl group such as 4-chlorophenyl, 2,6-dichlorophenyl, 2,5-dichlorophenyl, 3,4-dichlorophenyl, 3-chlorophenyl, 3-bromophenyl, 4-bromophenyl, 3,4-dibromophenyl, 3-chloro-4-fluorophenyl, 2 fluorophenyl and the like; a mono- or di(hydroxy)phenyl group such as 4-hydroxyphenyl, 3-hydroxyphenyl, 2,4-dihydroxyphenyl, and the like; a nitrophenyl group such as 3- or 4-nitrophenyl; a cyanophenyl group, for example, 4-cyanophenyl; a mono- or di(lower alkyl)phenyl group such as 4-methylphenyl, 2,4-dimethylphenyl, 2-methylphenyl, 4-(isopropyl)phenyl, 4-ethylphenyl, 3-(n-propyl)phenyl and the like; a mono- or di(alkoxy)phenyl group, for example, 2,6-dimethoxyphenyl, 4-methoxyphenyl, 3-ethoxyphenyl, 4 (isopropoxy)phenyl, 4-(t-butoxy)phenyl, 3-ethoxy-4 methoxyphenyl and the like; 3- or 4-trifluoromethylphenyl; a mono- or dicarboxyphenyl group such as 4-carboxyphenyl or a mono- or di(hydroxymethyl)phenyl such as 3-(hydroxymethyl)phenyl or 3,4-di(hydroxymethyl)phenyl; a mono- or di(aminomethyl)phenyl such as 2-(aminomethyl)phenyl or 2,4-(aminomethyl)phenyl; or a mono- or di(N-(methylsulfonylamino))phenyl such as 3-(N-(methylsulfonylamino))phenyl. Also, the term "substituted phenyl" represents disubstituted phenyl groups wherein the substituents are different, for example, 3-methyl-4-hydroxyphenyl, 3.chloro.4-hydroxyphenyl, 2-methoxy-4-bromophenyl, 4-ethyl.2-hydroxyphenyl, 3-hydroxy-4-nitrophenyl, 2.hydroxy-4-chlorophenyl and the like.

The term "$C_1$-$C_{10}$ substituted alkyl" refers to a $C_1$-$C_{10}$ alkyl group substituted by one or more halogen, phenyl, substituted phenyl, phenoxy, substituted phenoxy, nitro, carbamoyl, cyano, $C_1$-$C_6$ alkylsulfonylamino or $C_1$-$C_6$ alkoxy groups. The substituted alkyl groups may be substituted one or more times with the same or with different substituents.

Examples of the above substituted alkyl groups include cyanomethyl, nitromethyl, trityloxymethyl, methoxymethyl, ethoxymethyl, t-butoxymethyl, chloromethyl, bromomethyl, iodomethyl, 2,4-dichloro(n-butyl), chloroethyl, bromoethyl, fluoroethyl, iodoethyl, chloropropyl, bromopropyl, fluoropropyl, iodopropyl and the like.

The term $C_1$-$C_{10}$ alkoxycarbonyl refers to a $C_1$-$C_{10}$ alkoxy group bonded to a carbonyl function. In other words, the $C_2$ alkoxycarbonyl group is ethoxycarbonyl.

The term "$C_1$-$C_{20}$ divalent organic residue" (R) denotes typical organic linking groups bonded to the adjacent atoms through non-oxo carbon atoms. Thus, the $C_1$-$C_{20}$ linking group may be selected from a wide variety of alkylene, alkenylene, alkynylene, cycloalkylene, carbocyclic and heterocyclic arylene and combinations of such divalent groups. The alkylene linking groups may contain within their main chain hetero atoms, e.g., oxygen, sulfur, sulfonyl, nitrogen, substituted nitrogen, and/or cyclic groups such as cycloalkylene, carbocyclic arylene, or divalent aromatic heterocyclic groups. Such residues optionally contain one or more heteroatoms.

As used herein, X is preferably hydroxy, carboxy, or $C_1$-$C_{10}$ alkoxycarbonyl.

Preferred R groups include: alkylene, e.g., ethylene, propylene, butylene, 2,2-dimethylpropylene; cycloalkylene, e.g., 1,2-1,3 and 1,4-cyclohexanediyl; arylene, e.g., 1,2.1,3 and 1,4-phenylene; arylenealkylene, e.g., $CH_2CH_2$—4—$C_6H_4$—, —$CH_2$—3—$C_6H_4$—, —$CH_2$—4-$C_6H_4$—; cycloalkylenealkylene, e.g., —$CH_2$—4-$C_6H_{10}$—; $CH_2CH_2$-4-$C_6H_{10}$—; alkylene-cycloalkylenealkylene, e.g., —$CH_2$—4-$C_6H_{10}$—$CH_2$—; alkylene-arylenealkylene, e.g., $CH_2CH_2$—4-$C_6H_4$—$CH_2CH_2$—; alkylene ($-Y$—alkylene)$_{1-3}$; (alkylene-Y-)$_{1-2}$ arylene; alkylene-Y-arylene-Y-alkylene; arylene-Y-arylene alkylene-arylene-Y-arylene; arylene-alkylene-Y-arylene; arylene-alkylene-Y-arylene-alkylene; arylene-alkylene-Y-alkylene-arylene; alkylene-arylene-Y-alkylene-arylene and alkylene-arylene-Y-arylene-alkylene, wherein Y is selected from —O—, —S—, —$SO_2$, —$N(R_2)$— and —$SO_2N(R_3)$—, wherein $R_2$ is selected from lower alkyl, cycloalkyl or aryl and $R_3$ is selected from hydrogen, lower alkyl, cycloalkyl or aryl. The term arylene in the above definitions includes both carbocyclic and heterocyclic divalent radicals such as those derived from benzene, naphthalene biphenyl, benzothizole, thiophene, furan, 1,3,4-thiadiazole, 1,3,4-oxadiazole, thiazole, isothiazole, pyrazole, benzoxazole, benzimidazole, etc.

As used herein, when R and X are taken together, i.e., —R—X—, preferred groups can be selected from $C_1$-$C_{10}$ alkylene-$CO_2R_4$, $C_2$-$C_{10}$ alkylene-OH, $C_1$-$C_{10}$ alkylene-phenylene-$CO_2R_4$, arylene-$C_1$-$C_{10}$ alkylene-$CO_2R_4$, arylene-$C_2$-$C_{10}$ alkylene-$(CO_2R_4)_2$, arylene-$CO_2R_4$, $C_1$-$C_{10}$ alkylene-O-arylene-$CO_2R_4$, $C_1$-$C_{10}$ alkylene-arylene-$C_1$-$C_{10}$ alkylene-$CO_2R_4$, $C_1$-$C_{10}$ alkylene-O-arylene-$C_1$-$C_{10}$ alkylene-$CO_2R_4$, arylene-$C_1$-$C_{10}$ alkylene-O-arylene-$C_1$-$C_{10}$ alkylene-$CO_2R_4$, and $C_1$-$C_{10}$ alkylene cyclohexylene-$C_1$-$C_{10}$ alkylene-OH, wherein $R^4$ is hydrogen or $C_1$-$C_6$ alkyl.

In the above formula, M is preferably an alkali metal cation, most preferably Na+. Further, $R^1$ is preferably hydrogen.

As a further aspect of the present invention, there is provided an amorphous color concentrate comprising an amorphous polyester having copolymerized therein or reacted therewith at least about 5.0 weight percent of a residue of Formula (I).

As a further aspect of the present invention, there is provided a partially-crystalline polyester color concentrate composing a partially-crystalline polyester having copolymerized therein or reacted therewith at least about 5.0 weight percent of a residue of Formula (I).

As a further aspect of the present invention, there is provided a colored semicrystalline powder having an average particle diameter of less than about 50 microns comprising a normally-amorphous polyester or a partially crystalline polyester which has been modified by dissolution-crystallization-precipitation to impart increased crystallinity thereto having copolymerized therein or reacted therewith at least about 5.0 weight percent of a residue of Formula (I).

As a preferred embodiment of the above aspects of the present invention, the copper phthalocyanine residue "Z" is unsubstituted.

It is preferred that the value of $\alpha$ be as low as practical, particularly when colorants of Formula (I) are being used to prepare color concentrates with loadings greater than about 1% by weight of colorant in the polyester compositions, since the presence of the sulfonic acid group and salts thereof causes problems in the polymerization reaction. When colorants of Formula (I) are being used at relatively low levels, e.g., at 100–1,000 ppm to color plastics for packaging, the presence of sulfonic acid groups or salts thereof is more readily tolerated without adverse effects. Also, the value of $\beta$ can vary from 1–4 if the colorants are to be used at low levels (100–1,000 ppm) for coloring plastics for packaging, since the degree of chain termination resulting from only one reactive group and cross-linking resulting from having more than two reactive groups is not sufficient to adversely affect the polymer's properties. When colorants of Formula (I), however, are being used at higher levels (1–20% by weight) to produce concentrates, the average numerical value of $\beta$ is preferably as close to 2 as practical. Usually, average values of $\beta$ can be feasibly obtained ranging from about 2.0 to about 2.5.

The colored polyester compositions provided by this invention comprise extrusion, molding and fiber grade, thermoplastic, linear polyester having reacted therewith or copolymerized therein a compound of Formula (I). It is apparent that the amount of residue present in the polyester material will vary substantially depending on several factors such as the particular compound being used, for example, the tint or depth of shade desired, and the thickness of the article, e.g., film, bottle, etc., to be produced from the colored polyester composition. For example, relatively thin film and thin-walled containers require higher levels of the compounds of Formula (I) to produce an equivalent color than do thicker articles such as sheet material or tubing.

The polyesters which may be used in the preparation of the compositions of our invention include linear, thermoplastic, crystalline or amorphous polyesters produced by conventional polymerization techniques from one or more diols and one or more dicarboxylic acids. The polyesters normally have an inherent viscosity (IV) of about 0.4 to about 1.2. The preferred polyesters comprise at least about 50 mole percent terephthalic and/or 2,6-naphthalenedicarboxylic acid residues and at least about 50 mole percent ethylene glycol and/or 1,4-cyclohexanedimethanol residues. Particularly preferred polyesters are those containing from about 75 to 100 mole percent terephthalic and/or 2,6-naphthalenedicarboxylic acid residues and from about 75 to 100 mole percent ethylene glycol residues.

The diol components of the described polyesters may be selected from ethylene glycol, 1,4-cyclohexanedimethanol, 1,2-propanediol, 1,3-propanediol, 1,4-butanediol, 2,2-dimethyl-1,3-propanediol, 2-methyl-1,3-propanediol, 1,6-hexanediol, 1,2-cyclohexanediol, 1,4-cyclohexanediol, 1,2-cyclohexanedimethanol, 1,3-cyclohexanedimethanol, X,8-bis(hydroxymethyl)-tricyclo-[5.2.1.0]-decane wherein X represents 3, 4, or 5; and diols containing one or more oxygen atoms in the chain, e.g., diethylene glycol, triethylene glycol, dipropylene glycol, tripropylene glycol and the like. In general, these diols contain 2 to 18, preferably 2 to 8 carbon atoms. Cycloaliphatic diols can be employed in their cis or trans configuration or as mixtures of both forms.

The acid components (aliphatic, alicyclic, or aromatic dicarboxylic acids) of the linear polyester are selected, for example, from terephthalic acid, isophthalic acid, 1,4-cyclohexanedicarboxylic acid, 1,3-cyclohexanedicarboxylic acid, succinic acid, glutaric acid, adipic acid, sebacic acid, 1,12-dodecanedioic acid, 2,6-naphthalenedicarboxylic acid and the like. In the polymer preparation, it is often preferable to use a functional acid derivative thereof such as the dimethyl, diethyl, or dipropyl ester of the dicarboxylic acid. The anhydrides or acid halides of these acids also may be employed where practical.

The novel colored polyester compositions provided by this invention are useful in the manufacture of containers or packages for comestibles such as beverages and foods. By the use of known heat-setting techniques, certain of the polyesters are, in terms of color, I.V. and heat distortion, stable at temperatures up to about 100° C. Such stability characteristics are referred to as "hot-fill" stability. Articles molded from these polyesters exhibit good thin-wall rigidity, excellent clarity and good barrier properties with respect to moisture and atmospheric gases, particularly carbon dioxide and oxygen. The colored polyesters are particularly useful for the fabrication of containers having a wall thickness of about 10 to 30 mils. Further, the color concentrates of the present invention may be melt-blended with other colored or uncolored polyesters or blended with other polymers used in packaging materials. Thus, as a further aspect of the present invention, there is provided a formed article comprising the polyester composition as described above.

The linear polyesters most preferred for use in one embodiment of the invention comprise poly(ethylene terephthalate), poly(ethylene terephthalate) wherein up to 5 mole percent of the ethylene glycol residues have been replaced with residues derived from 1,4-cyclohexanedimethanol and poly(ethylene 2,6-naphthalenedicarboxylate) and wherein the polyesters have been sufficiently heat set and oriented by methods well known in the art to give a desired degree of crystallinity. For the manufacture of blow-molded beverage bottles, the most preferred polyesters have an I.V. of 0.65 to 0.85, and a glass transition temperature (Tg) greater than 70° C. The glass transition temperature (Tg) referred to herein is determined by Differential Scanning Calorimetry at a scan rate of 20 Centigrade Degrees/minutes. The inherent viscosities (I.V., dl/g) of the polyesters described herein are determined at 25° C. using 0.5 g polymer per 100 mL of a solvent consisting of 60 parts by weight phenol and 40 parts by weight tetrachloroethane.

Colorants of Formula (I) are added at levels of about 1–5,000 ppm (parts by weight) before or during the polymerization reaction. For example, the colorants may be added along with the initial glycol and diacid (or ester) reactants, immediately prior to the polycondensation stage or subsequently. For this end use, the colorant compound of Formula (I) may contain one or a multiplicity of reactive groups, since addition of the copolymerizable colorants in relatively low levels does not interfere substantially with the polymer preparation even if chain termination or cross linking do occur.

The compounds of Formula (I) and the reacted residues thereof possess the critical property of being sufficiently thermally stable to permit their copolymerization with polyesters by adding them at the start or at an early stage of the polyester preparation. Neither the colorant compounds nor their reacted residues sublime under polymerization conditions and the residues are not extractable from the polyesters. The thermal stability of the compounds of Formula (I) is particularly important in the preparation of the color concentrates, i.e., polyesters containing from 1.0, especially at least 5.0, to as high as 50 weight percent of colorant residue. The color concentrates are advantageous in that the colorant moiety (1) is stable to light, heat and chemicals, (2) is resistant to sublimation, heat migration, bleeding and leaching by solvents, (3) possesses high color value or chroma and visible light absorption characteristics which allows the color concentrates to be combined with other color concentrates to provide a range of colors, (4) is safe to humans and the environment, and (5) may be blended with other polymers.

The colored semicrystalline powders provided by this invention may be derived from the color concentrates by means of a dissolution-crystallization-precipitation technique described in detail below. Various processes for the manufacture of finely-divided forms of polyesters have been disclosed in the prior art such as U.S. Pat. Nos. 4,378,228, 4,254,207, 3,586,654, 3,931,082, 4,267,310, 4,305,864, 4,451,606, 3,674,736 and 3,669,922. Some of these known processes include the presence of pigments such as carbon black during particle size reduction to produce colored polyester powders. The known procedures are summarized below.

1. Comminution, as by grinding, which is difficult and expensive and results in highly irregular-shaped particle having a broad range of particle size distribution.
2. Spray drying techniques which tend to produce "hollow shells" or porous particles and also are hazardous when organic solvents are used to dissolve the polyester.
3. Dispersion processes which involve melting the polymer in an inert solvent in the presence of a non-ionic dispersing agent. Polyester, in contrast to other thermoplastic polymers, tend to hydrolyze (decompose) when melted in the presence of water and the particles thus produced have a strong tendency to agglomerate or coalesce.
4. Heating under shearing agitation conditions a condensation polymer in an aprotic liquid which is not a solvent for the polymer and in the presence of a dispersing agent to form small liquid particles and cooling with agitation. Colorants added during this process are still extractable, sublimable, and may exude from the polymer.
5. Solvent induced crystallization wherein an amorphous polymer is initially contacted with a crystal-inducing fluid under certain conditions while the polymer is subjected to physical and/or ultrasonic forces. Colorants added during this process are not reacted with the polymer and therefore are subject to removal from the polymer.
6. Producing microcrystalline polyesters by a hydrolytic removal of amorphous regions of synthetic, linear polyesters followed by a mechanical disintegration of the resulting aggregated microcrystals.
7. Crystallization of polyesters in the presence of nucleating agents.

The prior art does not disclose the preparation of colored microcrystalline polyester powders wherein an amorphous or partially-crystalline polyester, having a thermally-stable, colorant compound of Formula (I) copolymerized therein, is converted to a colored, microcrystalline, polyester powder by means of a dissolution-crystallization-precipitation procedure. The prior art also fails to disclose microcrystalline, polyester powders containing high levels of colorant incorporated therein which cannot be removed by extration or sublimation and which does not exude from the surface of the polymer.

The amorphous color concentrates of our invention exhibit a glass transition temperature (Tg) and no, or only a trace of, crystallization or melting point by differential scanning calorimetry (DSC). Examples of such amorphous polyesters include those obtained by the polymerization of a colorant compound of Formula (I), terephthalic and/or 2,6-naphthalenedicarboxylic acid and a branched-chain diol having the formula

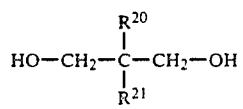

wherein $R^{20}$ is hydrogen or an unsubstituted or substituted alkyl, cycloalkyl or aryl radical, and $R^{21}$ is an unsubstituted or substituted alkyl, cycloalkyl or aryl radical. Preferred amorphous polyester color concentrates have an inherent viscosity of about 0.2 to 0.8 and are comprised of:

(i) diacid residues comprised of at least 50, preferably at least 80, mole percent terephthalic and/or 2,6-naphthalenedicarboxylic acid residues;
(ii) diol residues comprised of at least 50, preferably at least 80, mole percent of residues of a diol having the formula

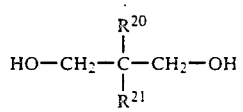

wherein $R^{20}$ is hydrogen or lower alkyl and $R^{21}$ is lower alkyl; and
(iii) residues of a colorant compound of Formula (I).

The particularly preferred amorphous polyester color concentrates are comprised of (i) diacid residues consisting essentially of terephthalic and/or 2,6-naphthalenedicarboxylic acid residues; (ii) diol residues consisting essentially of 2,2-dimethyl-1,3-propanediol residues; and (iii) residues of a colorant compound of Formula I.

Other amorphous polyesters, as defined above, suitable for preparing the colored semicrystalline powders may be obtained by employing (1) two dicarboxylic acids and one or more diols or (2) two diols and one or more dicarboxylic acids according to known procedures for obtaining amorphous polyesters. The polyester comprising a diacid component consisting of 75 mole percent terephthalic acid residues and 25 mole percent 1,4 cyclohexanedicarboxylic acid residues, a diol component consisting of 1,4-butanediol residues and residues of a compound of Formula (I) is an example of such a polyester.

The partially-crystalline color concentrates of this invention usually exhibit a glass transition temperature, a crystallization temperature and a melting temperature by DSC. These partially-crystalline, polyester concentrates are comprised of (i) diacid residues consisting of at least 80 mole percent terephthalic acid residues, 2,6-naphthalenedicarboxylic acid residues, 1,3-cyclohexanedicarboxylic acid residues, 1,4-cyclohexanedicarboxylic acid residues or a mixture thereof, (ii) diol residues consisting of at least 50 mole percent of residues having the formula —O—$(CH_2)_p$—O—wherein p is 2, preferably 4, to 12 and (iii) residues of colorant compound (I). A preferred partially-crystalline color concentrate has a melting temperature of at least 110° C. and is comprised of (i) diacid residues comprised of at least 80 mole percent terephthalic acid residues, (ii) diol residues comprised of at least 80 mole percent of residues of 1,4-butanediol and (iii) residues of a colorant compound of Formula (I). An especially preferred partially-crystalline color concentrate has a melting temperature of at least 110° C. and consists essentially of (i) terephthalic acid residues, (ii) 1,4-butanediol residues and (iii) a colorant compound of Formula (I).

The colored semicrystalline powders provided by this invention may be obtained by means of a dissolution-crystallization-precipitation procedure wherein the amorphous or partially-crystalline polyester color concentrates described above are dissolved in an organic solvent from which the polymeric color concentrate is recovered in a finely divided form consisting of particles of relatively uniform size, e.g., from about 10 to 50 microns. If desired, the particle size of the colored semicrystalline powders may be reduced further by conventional grinding processes. Examples of solvents in which the amorphous and/or partially-crystalline concentrates may be dissolved include halogenated hydrocarbons such as aliphatic chlorides, e.g., methylene chloride; esters such as alkyl esters of carboxylic acids, e.g., ethyl acetate and methyl benzoate; hydrocarbons such as toluene; and ethers such as tetrahydrofuran. We have found methylene chloride to be a particularly effective solvent.

The particular dissolution-crystallization-precipitation procedure utilized is not critical. The amorphous or partially-crystalline concentrate may be dissolved in a suitable solvent at elevated temperatures and then crystallized in a finely-divided state by cooling, with or without a reduction in the volume of solvent, i.e., either with or without a solution concentration step. Another useful technique involves dissolving the amorphous concentrate in an organic solvent, either at ambient or elevated temperature, and then adding to the solution another miscible solvent which causes crystallization of the colored semi-crystalline powder. The use of methylene chloride as the primary solvent and an alkyl acetate such as ethyl acetate as the "crystallization-inducing" solvent has been found to be particularly efficacious. Depending on their intended utility, the colored semicrystalline powders may be extracted with a suitable organic solvent to remove relatively low molecular weight polyester oligomers. Examples of oligomer-extracting solvents include ketones such as acetone, 2-pentanone, 3-methyl-2-butanone, 4-methyl.2-pentanone, 2-hexanone and 5-methyl-2-hexanone; hydrocarbons such as hexane, heptane and toluene; and ethers such as tetrahydrofuran. Another, but not preferred, dissolution-precipitation procedure involves dissolving the amorphous color concentrates in certain solvents, e.g., ethyl acetate, from which the polymeric color concentrate, after undergoing a change in morphology, precipitates.

Some of the more crystalline polyesters such as poly(ethylene terephthalate) and poly(tetramethylene terephthalate) require the use of a high-boiling solvent in the dissolution-precipitation procedure. Examples of such high-boiling solvents include alkyl esters of aromatic carboxylic acids, e.g., alkyl benzoates, and alkyl phthalates; aliphatic dicarboxylic acid esters; glycol esters, e.g., ethylene glycol diacetate; diethylene glycol diacetate; aromatic ketones, e.g., acetophenone, and aromatic oxides; e.g., diphenyl oxide; and aliphatic carboxamides, e.g., N,N.dimethylformamide and isophorone. Methyl benzoate and ethylene glycol diacetate are particularly preferred high-boiling solvents since they are readily available, have a pleasant odor and do not cause color problems during crystallization which sometimes is a problem with acetophenone.

In one variation of the process, crude polyester color concentrate is prepared and granulated to a very course powder which is heated with a high-boiling solvent (methyl benzoate) to facilitate solution. Upon cooling, crystallization-precipitation occurs and a diluent such as acetone usually is needed to permit stirring. Filtration gives the finely.divided powder which may require washing or reslurrying to remove the crystallization solvent.

In another variation of the dissolution-crystallization-precipitation process, crystallization can occur as an integral part of the polyester color concentrate manufacturing process wherein the crystallization solvent is added to a melt of the concentrate to obtain a solution of the color concentrate which then may be obtained as a powder by precipitation. The polyester color concentrate powder is thus obtained in a purified form without the need of granulating by a means which may be used in conjunction with batch processing.

The dissolution-crystallization-precipitation procedure alters the morphology of the amorphous and partially-crystalline polyester color concentrates in a number of respects. X-Ray diffraction analysis of the colored semicrystalline powders shows a marked increase in the crystallinity of the polyester and, while the amorphous polyester concentrates do not exhibit a melting temperature, the microcrystalline concentrates usually (almost always) exhibit a melting temperature by DSC. Although the weight average molecular weight (Mw) may increase, decrease or not be changed by the dissolution-crystallization-precipitation procedure, the number average molecular weight (Mn) always increases, the magnitude of the increase depending on the degree to which oligomeric material has been removed from the colored semicrystalline polyester powder. The polydispersity ratio (Mw:Mn) of the colored semicrystalline polyester is always less than that of the polyester concentrate from which it is prepared due to the increase in Mn (even when Mw increases, Mn increases more). Finally, the inherent viscosity of the colored semicrystalline powders normally is slightly higher than that of the color concentrate.

The amorphous and partially-crystalline polyester color concentrates may be used in coloring various thermoplastic polymeric materials when nonextractability or non-volatility of the colorant is critical because of toxicity considerations, e.g., in rigid and flexible packaging materials for food. The concentrates and powders may be used in formulating inks, coatings, toners for impactless printing, and similar products.

The polyester color concentrates may be prepared according to conventional esterification or transesterification and melt polycondensation procedures using (i) a dicarboxylic acid or, preferably, a lower alkyl ester thereof, (ii) a diol and (iii) a compound of Formula (I) bearing one to four, preferably about two, polyester reactive groups. Normally, at a 50 mole percent excess of the diol is used. The colorant compound of Formula (I) preferably is added with the other monomers at the commencement of the color concentrate manufacture although it may be added subsequently, e.g., at the beginning or during the polycondensation step. The concentration (weight percent) of the colorant residue is determined by summing up the weights of all the components charged to the reactor and subtracting the sum of the weights of the components removed during transesterification and polycondensation, e.g., methanol and excess diol. The difference represents the theoretical yield of the color concentrate. The weight of the methine colorant charged to the reactor is divided by the theoretical weight and multiplied by 100 to give the weight percent of colorant residue.

The novel color concentrates and their preparation are further illustrated by the experimental section below. The inherent viscosities specified herein are determined at 25° C. using 0.5 g of polymer (polyester color concentrate) per 100 mL of a solvent consisting of 60 weight percent phenol and 40 weight percent tetrachloroethane. The weight average molecular weight (Mw) and number average molecular weight value referred to herein are determined by gel permeation chromatography. The melting temperatures are determined by differential scanning calorimetry on the first and/or second heating cycle at a scanning rate of 20° C. per minute and are reported as the peaks of the transitions.

The color concentrates provided by this invention comprise a polyester composition having copolymerized therein at least 0.5 wt %, based on the weight of the polyester, or more of the residue of one or more of colorants of Formula (I) wherein the initial colorant contains about two polyester reactive groups. Normally, the color concentrates will not contain greater than about 30 wt % of colorant residue, with a concentration in the range of about 5 to 20 wt % being preferred.

Colorants of Formula (I) above containing the sulfonamide linking groups can be prepared by chlorosulfonation of the corresponding copper phthalocyanine compounds to introduce 1–4 sulfonyl chloride groups followed by reaction of the sulfonyl chloride derivatives with amines to produce the sulfonamide compounds. These reactions are well known in the chemical literature. [(See for example, British Patent No. 883,807; F. Brodman, et al., Rev. Chim. (Bucharest) 17(2) 74-7 (1960) (Rom.); Chemical Abstracts 65:833 (1966); German Patent No. 1,193,625; Chemical Abstracts 65:7150 (1965); U.S. Pat. Nos. 2,219,330 and 3,053,850, incorporated herein by reference; and German Patent No. 1,156,908; Chemical Abstracts 60:10850 (1964)]. Usually the copper phthalocyanine tetrasulfonyl chlorides are prepared by reacting either copper phthalocyanine or tetrasodium salt of copper phthalocyanine.tetrasulfonic acid with excess chlorosulfonic acid at temperatures between about 125-145° C. or by reacting first with excess chlorosulfonic acid and then adding thionyl chloride to complete the reaction at slightly lower temperatures. The copper phthalocyanine di- and trisulfonyl chlorides and mixtures thereof are prepared similarly, but generally at temperatures at 120° C. or below, again usually with thionyl chloride present in the later stages of the reaction.

Conditions for reacting the copper phthalocyaninesulfonyl chlorides with amines to produce the sulfonamide derivative are also known. Thus, compounds of Formula (I) are conveniently prepared by contacting intermediate sulfonyl chlorides of Formula (II),

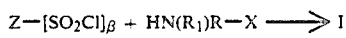

wherein $\beta$, M, and Z are as defined above, with amines of Formula (III), wherein R and $R_1$ are as defined above, under suitable reaction conditions. Normally, the reactions are carried out in the presence of an acid-binding agent such as an alkali metal hydroxide, carbonate or bicarbonate and at temperatures in the range of 0–80° C. preferably 20–50° C., for several hours. Solvents such as water, ketones, glycol ethers, N,N-dimethylformamide, tetrahydrofuran, etc. or mixtures thereof are suitable. When it is desirable to minimize the competitive reaction of hydrolysis of the sulfonyl chloride to the sulfonic acid, the amount of water present is decreased by use of largely nonaqueous solvents. Even under these conditions, however, when water-wet intermediate Z-sulfonyl chloride is used, some hydrolysis is usually observed.

The amine component (III) employed can be quite varied in structure, although it is usually desirable not to have more than two polyester reactive groups (X) present and preferably only one reactive group is present. It is also desirable to minimize the molecular weight of the amine component somewhat for reasons of maintaining good color value and/or economics. To produce colorants having optimum reactivity under copolymerization conditions, it is preferable that the reactive X groups in intermediate amines (III) be carboxylate ester or carboxyl groups. Typical amines (III) useful in the practice of the invention include those of Table I below.

The Experimental Section below is set forth to further describe the invention but in no fashion intended to limit the scope thereof.

Experimental Section

EXAMPLE 1

A sample (300 g, 30% solids - 90 g dry basis) of water-wet copper phthalocyaninesulfonyl chloride containing an average of about 2.5 sulfonyl chloride groups per molecule is added to a stirred beaker containing tetrahydrofuran (500 mL) and 3-amino-2,2-dimethylpropanol (100 mL) with good stirring to facilitate solution with external ice-water cooling at about 0–5° C. The reaction mixture is allowed to warm gradually to room temperature and stirring continued for about 12 hours and then drowned into 2L of dilute hydrochloric acid (ph<5–6). The blue solid is collected by filtration and the wet filter cake reslurried in 2L of 5% hydrochloric acid and filtered with vacuum. Most of the after is removed by vacuum filtration and air drying and then the still somewhat moist filter cake is added to tetrahydrofuran (250 mL) and the tetrahydrofuran and water removed under vacuum to leave a fairly dry product. This product when analyzed by thin-layer chromatography shows a small amount of very polar by-product presumed to be some of the sulfonic acid derivative. This compound can be used without further purification to impact color to polyesters by copolymerization particularly when used at lower levels even with some sulfonic acid derivative present. Further purification to remove most of the sulfonic acid derivative is accomplished by dissolving a portion (25 g) of the crude material in tetrahydrofuran (100 mL) followed by chromatography through Florisil (Eastman) in a coarse glass-fritted funnel using methylene chloride followed by methylene chloride:tetrahydrofuran (50:50 v/v) for elution until no more blue color is eluted. The eluents are combined and the solvent removed under vacuum to leave the cyan product (18.8 g) essentially free of any sulfonic acid derivative largely represented by the formula: Z—[SO$_2$NHCH$_2$C(CH$_3$)$_2$CH$_2$OH]$_{2.5}$.

EXAMPLE 2

A sample (300 g, 30% solids—90 g dry basis) of water-wet copper phthalocyaninesulfonyl chloride containing an average of about 2.5 sulfonyl chloride groups per molecule is reacted with 2-amino-2-methyl-1-propanol (100 mL), as described in Example 1 and the product chromatographed similarly to give a sulfonamide derivative largely represented by the formula: Z—[SO$_2$NHC(CH$_3$)$_2$CH$_2$OH]$_{2.5}$.

EXAMPLE 3

The following materials are placed in a 500 mL three-necked, round-bottom flask:
87.30 g (0.45m) dimethyl terephthalate
60.75 g (0.675m) 1,4-butanediol
0.0108 g Ti from a n-butanol solution of titanium tetraisopropoxide
10.0 g colorant of Example 1

The flask is equipped with a nitrogen inlet, stirrer, vacuum outlet, and condensing flask. The flask and contents are heated in a Belmont metal bath with a nitrogen sweep over the reaction mixture as the temperature is increased to 200° C. and then to 220° C. over one hour. Over the next 1.5 hour the temperature is increased to about 240° C. and a vacuum is applied until the pressure is reduced to 0.5 mm Hg. The polycondensation is completed by heating the flask and contents at about 240° C. for 30 minutes under a pressure of 0.1 to 0.5 mm Hg. The vacuum is then relieved with nitrogen and methyl benzoate (125 mL) is added slowly and stirred to solution over about 10 minutes with the flask still in the metal bath. The resulting solution is transferred to a 2L beaker and stirred until crystallization occurs. Acetone (600 mL) is added slowly with stirring to dilute the slurry and keep it stirrable. The diluted slurry is stirred for 30 minutes, filtered and the cake is washed with acetone. The cake is twice reslurried in acetone and then dried in air. The resulting bright blue semicrystalline polyester powder, containing 9.25 weight percent of the copper phthalocyanine colorant residue, has an inherent viscosity of 0.732, a melting temperature of 215° C., a weight average molecular weight of 50,915, a number average molecular weight of 15,703 and a polydispersity value of 3.24.

EXAMPLE 4

The following materials are placed in a 500 mL three-necked, round-bottom flask:
87.30 g (0.45 m) dimethyl terephthalate
60.75 g (0.675 m) 1,4-butanediol
0.0108 g Ti from a n-butanol solution of titanium tetraisopropoxide
10.0 g colorant of Example 1

The flask is equipped with a nitrogen inlet, stirrer, vacuum outlet, and condensing flask. The flask and contents are heated in a Belmont metal bath with a nitrogen sweep over the reaction mixture as the temperature is increased to 200° C. and then to 230° C. over 3.25 hours. Vacuum is applied until the pressure is reduced to 0.5 mm Hg and the polycondensation is completed by heating the flask and contents at about 230° C. for 30 minutes under a pressure of 0.1 to 0.5 mm Hg. The vacuum is then relieved with nitrogen and methyl benzoate (125 mL) is added slowly and stirred to solution over about 10 minutes with the flask still in the metal bath. The resulting solution is transferred to a 2L beaker and stirred until crystallization occurs. Acetone (700 mL) is added slowly with stirring to dilute the slurry and keep it stirrable. The diluted slurry is stirred for 30 minutes, filtered and the cake is washed with acetone. The cakes is twice reslurried in acetone and then dried in air. The resulting bright blue semicrystalline polyester powder, containing 9.25 weight percent of the phthalocyanine colorant residue, has an inherent viscosity of 0.312, a melting temperature of 218° C., a weight average molecular weight of 21,964, a number of average molecular weight of 12,664 and a polydispersity value of 1.73.

EXAMPLE 5

The following materials are placed in a 500 mL three-necked, round-bottom flask:
87.30 g (0.45 m) dimethyl terephthalate
60.75 g (0.675 m) 1,4-butanediol
0.0108 g Ti from a n-butanol solution of titanium tetraisopropoxide
24.0 g colorant of Example 1

The flask is equipped with a nitrogen inlet, stirrer, vacuum outlet, and condensing flask. The flask and contents are heated in a Belmont metal bath with a nitrogen sweep over the reaction mixture as the temperature is increased to 200° C. and then to 230° C. over 3.25 hours. Vacuum is applied until the pressure is reduced to 0.5 mm Hg and the polycondensation is completed by heating the flask and contents at about 230° C. for 30 minutes under a pressure of 0.1 to 0.5 mm Hg. The vacuum is then relieved with nitrogen and methyl benzoate (125 mL) is added slowly and stirred to solution over about 10 minutes with the flask still in the metal bath. The resulting solution is transferred to a 2L beaker and stirred until crystallization occurs. Acetone (700 mL) is added slowly with stirring to dilute the slurry and keep it stirrable.

The diluted slurry is stirred for 30 minutes, filtered and the cake is washed with acetone. The cake is twice reslurried in acetone and then dried in air. The resulting dark blue semicrystalline polyester powder, containing 19.84 weight percent of the phthalocyanine colorant residue, has an inherent viscosity of 0.366, a melting temperature of 207° C., a weight average molecular weight of 29,469, a number of average molecular weight of 12,947 and a polydispersity value of 2.27.

EXAMPLE 6

The following compounds are placed in a 500 mL, single-necked, round-bottom flask:
97 g (0.5 m) dimethyl terephthalate
62 g (1.0 m) ethylene glycol
0.29 mL of a n-butanol solution of acetyltriisopropyl titanate which contains 0.0087 g Ti
0.0192 g colorant of Example 1 (200 ppm)

The flask is equipped with a nitrogen inlet, stirrer, vacuum outlet, and condensing flask. The flask and contents are heated at 200° C. in a Belmont metal bath for 60 minutes, and 210° C. for 75 minutes, and at 230°

C for 50 minutes with a nitrogen sweep over the reaction mixture. The temperature of the bath is increased to 270° C. With a stream of nitrogen bleeding in the system, vacuum is applied slowly at 270° C. over a 10 minute period until the pressure is reduced to 100 mm Hg. The flask and contents are heated at 270° C. under a pressure of 100 mm Hg for 30 minutes. The metal bath temperature is increased to 285° C. and the pressure is reduced to 4.5 mm Hg over a 10 minute period. The flask and contents are heated at 285° C. under a pressure of 4.5 mm Hg for 25 minutes. Then the pressure is reduced to 0.3 mm Hg and polycondensation is continued at 285° C for about 15 minutes. The flask is removed from the metal bath and is allowed to cool while the polymer crystallizes. The resulting blue-green polymer has an inherent viscosity of 0.63 measured in a 60/40 ratio by weight of phenol/tetrachloroethane at a concentration of 0.5 g per 100 mL. A 15 mil film is prepared using a Pasadena Hydraulic, Inc. press on approximately 1 g of granules of the polymer sample. The mold with the pressed film is quenched with cold water so the film remains amorphous (see Example 10).

EXAMPLE 7

The following compounds are placed in a 500 mL, single-necked round-bottom flask:
135.8 g (0.70 m) dimethyl terephthalate
94.6 g (0.91 m) neopentyl glycol
1.45 mL of a n-butanol solution of titanium isopropoxide which contains 0.0177 g Ti
1.00 g colorant of Example 1

The flask is equipped with a nitrogen inlet, stirrer, vacuum outlet, and condensing flask. The flask and contents are heated in a Belmont bath with a nitrogen sweep over the reaction mixture as the temperature is increased to 200° C. and then to about 220° C. and over 1.5 hours. Over the next 0.5 hour, the temperature is increased to about 240° C. and then to about 260° C. over the next 0.5 hour. The temperature is quickly raised (over ~10 minutes) to 275° C. with a stream of nitrogen bleeding into the system and the pressure is reduced gradually to about 0.5 mm Hg. The polycondensation step is completed by heating the flask and contents thereof at about 275° C. for 1.25 hours under a pressure of 0.1–0.5 mm Hg. The flask is removed from the metal bath and is allowed to cool while the polymer solidifies. The resulting high molecular weight blue polymer, containing 0.61 weight percent of the phthalocyanine colorant residue, has an inherent viscosity of 0.67 when measured in a 60/40 ratio by weight of phenol/tetrachloroethane at a concentration of 0.5 g per 100 mL. When analyzed, the polymer shows no melting temperature, a weight average molecular weight of 46,844, a number average molecular weight of 19,929 and a polydispersity value of 2.35.

EXAMPLE 8

A portion (25.0 g) of the amorphous polyester color concentrate prepared in Example 7 is granulated using a Wiley mill and dissolved in methylene chloride (200 mL) at about 25° C. with stirring. Ethyl acetate (200 mL) is added and the methylene chloride is removed by distillation. The mixture is allowed to cool and stirred at about 25° C. for 4 hours during which time the colored semicrystalline powder separates. Acetone (200 mL) is added to facilitate stirring. The solid is collected by filtration, washed with acetone and air dried. The blue semicrystalline powder thus prepared (20.0 g) has an inherent viscosity of 0.53, a melting temperature of 139° C., a weight average molecular weight of 38,016, a number average molecular weight of 21,327 and a polydispersity of 1.78. A comparison of the absorbance of a methylene chloride solution of the starting copper phthalocyanine sulfonamide colorant with the absorbance of a methylene chloride solution of the color concentrate shows no shift in absorption maximum or change of shape of absorption curve which indicates good thermal stability of the colorant.

COMPARATIVE PREPARATION I

The following compounds are placed in a 500 mL, single-necked, round-bottom flask:
97 g (0.5 m) dimethyl terephthalate
62 g (1.0 m) ethylene glycol
0.29 mL of a n-butanol solution of acetyltriisopropyl titanate which contains 0.0087 g Ti
0.0192 g copper phthalocyanine (C. I. Pigment Blue 15) (200 ppm)

The flask is equipped with a nitrogen inlet, stirrer, vacuum outlet, and condensing flask. The flask and contents are heated at 200° C. in a Belmont bath for 60 minutes, at 210° C. for 75 minutes, and at 230° C. for 50 minutes with a nitrogen sweep over the reaction mixture. The temperature of the bath is increased to 270° C. With a stream of nitrogen bleeding in the system, vacuum is applied slowly at 270° C. over a 10 minute period until the pressure is reduced to 100 mm Hg. The flask and contents are heated at 270° C. under a pressure of 100 mm Hg for 30 minutes. The metal bath temperature is increased to 285° C. and the pressure is reduced to 4.5 mm Hg over a 10 minute period. The flask and contents are heated at 285° C. under a pressure of 4.5 mm Hg for 25 minutes. Then the pressure is reduced to 0.3 mm Hg and polycondensation is continued at 285° C. for about 15 minutes. The flask is removed from the metal bath and is allowed to cool while the polymer crystallizes. The resulting polymer has an inherent viscosity of 0.74 measured in a 60/40 ratio by weight of phenol/tetrachloroethane at a concentration of 0.5 g per 100 mL. A 15 mil film is prepared using a Pasadena Hydraulic, Inc. press on approximately 1 g of granules of the polymer sample. The mold with the pressed film is quenched with cold water so the film remains amorphous (see Example 10).

EXAMPLE 9

A 0.5 g sample of each film as prepared in Example 6 and COMPARATIVE PREPARATION I above is added to methylene chloride (50 mL) and allowed to stand at room temperature for 22 hours with occasional agitation. The mixture is then filtered. A light absorbance curve is obtained on each filtrate (extract) using a Perkin-Elmer UV/VIS Spectrophotometer, Model Lamba 6 with a 1.0 cc cell length. A comparison of the two curves shows that no colorant has been extracted from the film of Example 6, while considerable absorbance occurs at wavelengths of about 650–770 nm in the extract of the film of COMPARATIVE PREPARATION I which shows that free copper phthalocyanine (C. I. Pigment Blue 15) is not reacted into the polymer and is extractable.

EXAMPLE 10

The following materials are placed in a 500 mL three-necked, round-bottom flask:
116.40 g (0.60 m) dimethyl terephthalate 81.00 g (0.90 m) 1,4-butanediol
0.0145 g Ti from a n-butanol solution of titanium tetraisopropoxide
14.5 g colorant of Example 2

The flask is equipped with a nitrogen inlet, stirrer, vacuum outlet, and condensing flask. The flask and contents are heated in a Belmont metal bath with a nitrogen sweep over the reaction mixture as the temperature is increased to 200° C. and then to 220° C. over 2 hours. Over the next 1 hour the temperature is increased to about 240° C. and then to about 250° C. over the next 15 minutes. Vacuum is applied until the pressure is reduced to 0.5 mm Hg and the polycondensation is completed by heating the flask and contents at about 250° C. for 45 minutes under a pressure of 0.1 to 0.5 mm Hg. The vacuum is then relieved with nitrogen and methyl benzoate (125 mL) is added slowly and stirred to solution over about 10 minutes with the flask still in the metal bath. The resulting solution is transferred to a 2L beaker and stirred until crystallization occurs. Acetone (500 mL) is added slowly with stirring to dilute the slurry and keep it stirrable. The diluted slurry is stirred for 30 minutes, filtered and the cake is washed with acetone. The cake is twice reslurried in acetone and then dried in vacuum oven at 50° C. The resulting blue semicrystalline polyester powder, containing 9.98 weight percent of the copper phthalocyanine sulfonamide colorant residue, has an inherent viscosity of 0.397, a melting temperature of 218° C., a weight average molecular weight of 25,536, a number of average molecular weight of 15,930 and a polydispersity value of 1.60. The yield of 137 g (94.3% of the theoretical yield).

TABLE I

Typical Amines (III) Useful for Practice of the Invention

| R | $R_1$ | X |
|---|---|---|
| ⟨phenyl⟩–$CH_2O$–⟨phenyl⟩– | H | $CO_2CH_2CH_2Cl$ |
| ⟨phenyl⟩–$CH_2OCH_2$–⟨phenyl⟩– | H | $CO_2CH_2CH_2OCH_3$ |
| ⟨phenyl⟩–$CH_2O$–⟨phenyl⟩–$CH_2$– | H | $OCONHC_6H_5$ |
| –$CH_2$–⟨phenyl⟩–$SCH_2$–⟨phenyl⟩– | H | $CO_2CH_2CH_2OCOCH_3$ |
| –$CH_2$–⟨phenyl⟩–$SO_2$–⟨phenyl⟩–$CH_2$– | H | $CO_2CH_2C_6H_5$ |
| –$C_6H_{10}$-4–⟨phenyl⟩– | H | $CO_2CH_2CH_2CN$ |
| –$CH_2$–⟨thiophene⟩– | H | $OCOH$ |
| ⟨phenyl⟩–⟨phenyl⟩– | H | $OCON(CH_3)_2$ |

TABLE I-continued

Typical Amines (III) Useful for Practice of the Invention

| R | R$_1$ | X |
|---|---|---|
| naphthyl | H | $CO_2CH_3$ |
| 2,5-thienyl | H | $CO_2CH_3$ |
| 3-methoxycarbonyl-4-methyl-thien-2,5-diyl | H | $CO_2CH_3$ |
| 3-cyano-4-methyl-thien-2,5-diyl | H | $CO_2C_2H_5$ |
| 3-methyl-4-cyano-thien-2,5-diyl | H | $CO_2C_4H_9$-n |
| 1,3,4-thiadiazol-2,5-diyl | H | $CO_2C_2H_5$ |
| 5-(4-phenylene)-1,3,4-thiadiazol-2-yl | H | $CO_2CH_3$ |
| 2-(4-phenylene)-benzothiazol-... | H | $CO_2C_2H_5$ |
| 5-(4-phenylene)-1,3,4-oxadiazol-2-yl | H | $CO_2CH_3$ |
| 2-(4-phenylene)-benzoxazol-... | H | $CO_2H$ |

TABLE I-continued

Typical Amines (III) Useful for Practice of the Invention

| R | R₁ | X |
|---|----|---|
| 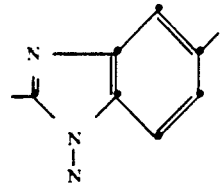 | H | $CO_2H$ |
| 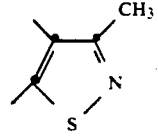 | H | $CO_2C_2H_5$ |
| 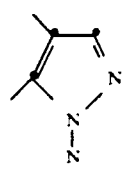 | H | $CO_2CH_3$ |
| 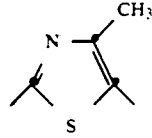 | H | $CO_2C_2H_5$ |
|  | 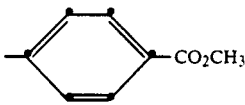 | $CO_2CH_3$ |
| 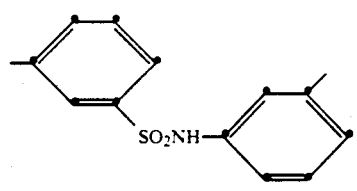 | H | $CO_2CH_3$ |
| 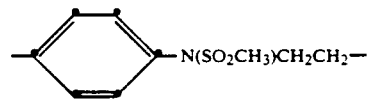 | H | OH |
| —$CH_2CH_2$— | H | OH |
| —$CH_2CH(CH_3)CH_2$— | H | OH |
| —$CH_2CH_2CH_2CH_2$— | H | OH |
| —$CH_2CH_2OCH_2CH_2$— | H | OH |
| —$CH_2CH_2$— | $CH_3$ | OH |
| —$(CH_2)_6$— | H | OH |
| —$CH_2CH_2$— | $CH_2CH_2OH$ | OH |
| —$CH_2CH_2$— | $CH_2CH_2OCOCH_3$ | $OCOCH_3$ |
| —$CH_2CH_2$— | H | $OCOCH_3$ |
| —$CH_2CH_2$— | H | $OCO_2C_2H_5$ |
| —$CH_2C(CH_3)_2CH_2OH$ | H | OH |
| —$CH_2CH_2$— | $C_2H_5$ | $OCOC_2H_5$ |
| —$CH_2CH_2CH_2CH_2$— | H | COOH |
| —$CH_2CH_2CH_2CH_2$— | H | $CO_2CH_2CH_2OH$ |
| —$CH_2CH_2CH_2CH_2$— | H | $CO_2CH_3$ |
| —$CH_2CH_2$— | $C_6H_{11}$ | OH |
| —$CH_2CH_2$— | $C_6H_5$ | $OCOCH_3$ |
| —$CH_2CH_2$— | $C_6H_5$ | $CO_2C_2H_5$ |
| —$CH_2CH_2SCH_2CH_2$— | H | OH |
| —$CH_2CH_2SO_2CH_2CH_2CH_2CH_2$— | H | OH |
| —$(CH_2CH_2O)_2CH_2CH_2$— | H | OH |
| —$CH_2CH_2N(SO_2CH_3)CH_2CH_2$— | H | $OCOCH_3$ |
| —$CH_2CH_2SO_2NH(CH_2)_4$— | H | $CO_2CH_3$ |

TABLE I-continued

Typical Amines (III) Useful for Practice of the Invention

| R | $R_1$ | X |
|---|---|---|
| —CH$_2$CH$_2$SO$_2$N(CH$_3$)CH$_2$CH$_2$— | H | OH |
| —CH$_2$—C$_6$H$_4$— | H | CO$_2$H |
| —CH$_2$—C$_6$H$_4$— | H | CO$_2$CH$_3$ |
| —CH$_2$CH$_2$—C$_6$H$_4$— | H | CO$_2$C$_2$H$_5$ |
| —CH$_2$CH$_2$O—C$_6$H$_4$— | H | COOH |
| —CH$_2$CH$_2$O—C$_6$H$_3$(CO$_2$CH$_3$)— | H | CO$_2$CH$_3$ |
| —CH$_2$CH(OH)CH$_2$— | H | OH |
| —CH$_2$CH(OCOCH$_3$)CH$_2$— | H | OCOCH$_3$ |
| —CH$_2$—(thiophene)—CH$_2$— | H | OH |
| —CH$_2$—(thiophene)—CH$_2$— | H | CO$_2$H |
| —CH$_2$CH$_2$S—C$_6$H$_4$— | H | CO$_2$H |
| —CH$_2$CH$_2$O—C$_6$H$_4$—OCH$_2$CH$_2$— | H | CO$_2$H |
| —CH$_2$—C$_6$H$_4$—CH$_2$— | H | CO$_2$C$_4$H$_9$-n |
| —CH$_2$—C$_6$H$_4$— | H | CO$_2$CH$_3$ |

TABLE I-continued
Typical Amines (III) Useful for Practice of the Invention

| R | $R_1$ | X |
|---|---|---|
| (cyclohexene ring) | H | $CO_2CH_3$ |
| (cyclohexene ring) | H | $CO_2CH_3$ |
| (cyclohexene ring with $CO_2CH_3$) | H | $CO_2CH_3$ |
| $(-CH_2CH_2O)_2-$(phenyl) | H | $CO_2CH_3$ |
| (phenyl-O-phenyl) | H | $CO_2CH_3$ |
| (phenyl) | $C_2H_5$ | $CO_2C_2H_5$ |

We claim:

1. A polyester composition having copolymerized therein or reacted therewith at least 0.001 weight percent of a residue of Formula (I)

$$(MO_3S)_a-Z-[SO_2N(R_1)R-X]_\beta \quad (I)$$

wherein

Z is a copper phthalocyanine residue, optionally substituted with 1-12 groups selected from $C_1$-$C_{10}$ alkyl, $C_1$-$C_{10}$ alkoxy, $C_1$-$C_{10}$ alkylthio, arylthio, or halo;

M is hydrogen, an alkali metal cation, an ammonium or substituted ammonium cation;

R is a $C_1$-$C_{20}$ divalent organic residue;

X is a group reactive with at least one of the functional groups of the monomers from which the polyester is prepared;

$R_1$ is hydrogen, $C_1$-$C_{10}$ alkyl, $C_1$-$C_{10}$ substituted alkyl, $C_3$-$C_{10}$ cycloalkyl, aryl, or a group of the formula —R—X;

$a$ is 0, 1, or 2; and $\beta$ is 1, 2, 3 or 4, provided that the sum of $a$ plus $\beta$ is equal to or less than 4.

2. The polyester composition of claim 1 wherein Z is an unsubstituted copper phthalocyanine residue.

3. The polyester composition of claim 1 wherein M is an alkali metal cation.

4. The polyester composition of claim 3 wherein M is $Na^+$.

5. The polyester composition of claim 1 wherein X is hydroxy, carboxy, or $C_1$-$C_{10}$ alkoxycarbonyl.

6. The polyester composition of claim 1 wherein $R^1$ is hydrogen.

7. The polyester composition of claim 1 wherein —R—X is selected from $C_1$-$C_{10}$ alkylene-$CO_2R_4$, $C_2$-$C_{10}$ alkylene-OH, $C_1$-$C_{10}$ alkylene-phenylene-$CO_2R_4$, arylene-$C_1$-$C_{10}$ alkylene-$CO_2R_4$, arylene-$C_2$-$C_{10}$ alkylene-$(CO_2R_4)_2$, arylene-$CO_2R_4$, $C_1$-$C_{10}$ alkylene-O-arylene-$CO_2R_4$, $C_1$-$C_{10}$ alkylene -arylene-$C_1$-$C_{10}$ alkylene-$CO_2R_4$, $C_1$-$C_{10}$ alkylene-O-arylene-$C_1$-$C_{10}$ alkylene-$CO_2R_4$, arylene-$C_1$-$C_{10}$ alkylene-O-arylene-$C_1$-$C_{10}$ alkylene-$CO_2R_4$, and $C_1$-$C_{10}$ alkylene cyclohexylene-$C_1$-$C_{10}$ alkylene-OH, wherein $R^4$ is hydrogen or $C_1$-$C_6$ alkyl.

8. The polyester composition of claim 1 wherein $R^1$ is hydrogen, $C_1$-$C_{10}$ alkyl, $C_3$-$C_{10}$ cycloalkyl, or phenyl.

9. The polyester composition of claim 1 wherein the residue of Formula (1) is present in a range of about 1 weight percent to about 30 weight percent.

10. The polyester composition of claim 9, wherein the residue of Formula (1) is present in a range of about 5 weight percent to about 20 weight percent.

11. The polyester composition of claim 1, wherein the value of $\beta$ is in a range from about 2.0 to about 2.5.

12. An amorphous color concentrate comprising an amorphous polyester having copolymerized therein or reacted therewith at least about 5.0 weight percent of a residue of Formula (I)

$$(MO_3S)_a-Z-[SO_2N(R_1)R-X]_\beta \quad (I)$$

wherein
- Z is a copper phthalocyanine residue, optionally substituted with 1-12 groups selected from $C_1-C_{10}$ alkyl, $C_1-C_{10}$ alkoxy, $C_1-C_{10}$ alkylthio, arylthio, or halo;
- M is hydrogen, an alkali metal cation, an ammonium or substituted ammonium cation;
- R is a $C_1-C_{20}$ divalent organic residue;
- X is a group reactive with at least one of the functional groups of the monomers from which the polyester is prepared;
- $R_1$ is hydrogen, $C_1-C_{10}$ alkyl, $C_1-C_{10}$ substituted alkyl, $C_3-C_{10}$ cycloalkyl, aryl, or a group of the formula $-R-X$;
- $\alpha$ is 0, 1, or 2; and
- $\beta$ is 1, 2, 3 or 4, provided that the sum of $\alpha$ plus $\beta$ is equal to or less than 4.

13. The polyester composition of claim 12 wherein Z is an unsubstituted copper phthalocyanine residue.

14. The polyester composition of claim 12 wherein M is an alkali metal cation.

15. The polyester composition of claim 12 wherein M is $Na^+$.

16. The polyester composition of claim 12 wherein X is hydroxy, carboxy, or $C_1-C_6$ alkoxycarbonyl.

17. The polyester composition of claim 12 wherein $R^1$ is hydrogen.

18. The polyester composition of claim 12 wherein the value of $\beta$ is in a range from about 2.0-2.5.

19. The polyester composition of claim 13 wherein $-R-X$ is selected from $C_1-C_{10}$ alkylene-$CO_2R_4$, $C_2-C_{10}$ alkylene-OH, $C_1-C_{10}$ alkylene-phenylene-$CO_2R_4$, arylene-$C_1-C_{10}$ alkylene-$CO_2R_4$, arylene-$C_2-C_{10}$ alkylene-$(CO_2R_4)_2$, arylene-$CO_2R_4$, $C_1-C_{10}$ alkylene-O-arylene-$CO_2R_4$, $C_1-C_{10}$ alkylene-arylene-$C_1-C_{10}$ alkylene-$CO_2R_4$, $C_1-C_{10}$ alkylene-O-arylene-$C_1-C_{10}$ alkylene-$CO_2R_4$, arylene-$C_1-C_{10}$ alkylene-O-arylene-$C_1-C_{10}$ alkylene-$CO_2R_4$, and $C_1-C_{10}$ alkylene cyclohexylene-$C_1-C_{10}$ alkylene-OH, wherein $R^4$ is hydrogen or $C_1-C_6$ alkyl.

20. The polyester composition of claim 12 wherein $R_1$ is hydrogen, $C_1-C_{10}$ alkyl, $C_3-C_{10}$ cycloalkyl, or phenyl.

21. A partially-crystalline polyester color concentrate composing a partially-crystalline polyester having copolymerized therein or reacted therewith at least about 5.0 weight percent of a residue of Formula (I)

$$(MO_3S)_a-Z-[SO_2N(R_1)R-X]_\beta \quad (I)$$

wherein
- Z is a copper phthalocyanine residue optionally substituted with 1-12 groups selected from $C_1-C_{10}$ alkyl, $C_1-C_{10}$ alkoxy, $C_1-C_{10}$ alkylthio, arylthio, or halo;
- M is hydrogen, an alkali metal cation, an ammonium or substituted ammonium cation;
- R is a $C_1-C_{20}$ divalent organic residue;
- X is a group reactive with at least one of the functional groups of the monomers from which the polyester is prepared;
- $R_1$ is hydrogen, $C_1-C_{10}$ alkyl, $C_1-C_{10}$ substituted alkyl, $C_3-C_{10}$ cycloalkyl, aryl, or a group of the formula $-R-X$;
- $\alpha$ is 0, 1, or 2; and
- $\beta$ is 1, 2, 3 or 4, provided that the sum of $\alpha$ plus $\beta$ is equal to or less than 4.

22. The polyester composition of claim 21 wherein Z is an unsubstituted copper phthalocyanine residue.

23. The polyester composition of claim 21 wherein M is an alkali metal cation.

24. The polyester composition of claim 21 wherein M is $Na^+$.

25. The polyester composition of claim 21 wherein X is hydroxy, carboxy, or $C_1-C_6$ alkoxy carbonyl.

26. The polyester composition of claim 21 wherein $R^1$ is hydrogen.

27. The polyester composition of claim 21 wherein the value of $\beta$ is in a range from about 2.0 to about 2.5.

28. The polyester composition of claim 21 wherein $-R-X$ is selected from $C_1-C_{10}$ alkylene-$CO_2R_4$, $C_2-C_{10}$ alkylene-OH, $C_1-C_{10}$ alkylene-phenylene-$CO_2R_4$, arylene-$C_1-C_{10}$ alkylene-$CO_2R_4$, arylene-$C_2-C_{10}$ alkylene-$(CO_2R_4)_2$, arylene-$CO_2R_4$, $C_1-C_{10}$ alkylene-O-arylene-$CO_2R_4$, $C_1-C_{10}$ alkylene-arylene-$C_1-C_{10}$ alkylene-$CO_2R_4$, $C_1-C_{10}$ alkylene-O-arylene-$C_1-C_{10}$ alkylene-$CO_2R_4$, arylene-$C_1-C_{10}$ alkylene-O-arylene-$C_1-C_{10}$ alkylene-$CO_2R_4$, and $C_1-C_{10}$ alkylene cyclohexylene-$C_1-C_{10}$ alkylene-OH, wherein $R^4$ is hydrogen or $C_1-C_6$ alkyl.

29. The polyester composition of claim 21 wherein $R^1$ is hydrogen, $C_1-C_{10}$ alkyl, $C_3-C_{10}$ cycloalkyl, or phenyl.

30. A colored semicrystalline powder having an average particle diameter of less than about 50 microns comprising a normally-amorphous polyester which has been modified by dissolution-crystallization-precipitation to impart crystallinity thereto having copolymerized therein or reacted therewith at least about 5.0 weight percent of a residue of Formula (I)

$$(MO_3S)_a-Z-[SO_2N(R_1)R-X]_\beta \quad (I)$$

wherein
- Z is a copper phthalocyanine residue, optionally substituted with 1-12 groups selected from $C_1-C_{10}$ alkyl, $C_1-C_{10}$ alkoxy, $C_1-C_{10}$ alkylthio, arylthio, or halo;
- M is hydrogen, an alkali metal cation, an ammonium or substituted ammonium cation;
- R is a $C_1-C_{20}$ divalent organic residue;
- X is a group reactive with at least one of the functional groups of the monomers from which the polyester is prepared;
- $R_1$ is hydrogen, $C_1-C_{10}$ alkyl, $C_1-C_{10}$ substituted alkyl, $C_3-C_{10}$ cycloalkyl, aryl, or a group of the formula $-R-X$;
- $\alpha$ is 0, 1, or 2; and
- $\beta$ is 1, 2, 3 or 4, provided that the sum of $\alpha$ plus $\beta$ is equal to or less than 4.

31. The polyester composition of claim 30 wherein Z is an unsubstituted copper phthalocyanine residue.

32. The polyester composition of claim 30 wherein M is an alkali metal cation.

33. The polyester composition of claim 30 wherein M is $Na^+$.

34. The polyester composition of claim 30 wherein X is hydroxy, carboxy, or $C_1-C_6$ alkoxycarbonyl.

35. The polyester composition of claim 30 wherein $R^1$ is hydrogen.

36. The polyester composition of claim 30 wherein the value of $\beta$ is in a range about 2.0 to about 2.5.

37. The polyester composition of claim 34 wherein —R—X is selected from $C_1$-$C_{10}$ alkylene-$CO_2R_4$, $C_2$-$C_{10}$ alkylene-OH, $C_1$-$C_{10}$ alkylene-phenylene-$CO_2R_4$, arylene-$C_1$-$C_{10}$ alkylene-$CO_2R_4$, arylene-$C_2$-$C_{10}$ alkylene-$(CO_2R_4)_2$, arylene-$CO_2R_4$, $C_1$-$C_{10}$ alkylene-O-arylene-$CO_2R_4$, $C_1$-$C_{10}$ alkylene -arlene-$C_1$-$C_{10}$ alkylene-$CO_2R_4$, $C_1$-$C_{10}$ alkylene-O-arylene-$C_1$-$C_{10}$ alkylene-$CO_2R_4$, arylene-$C_1$-$C_{10}$ alkylene-O-arylene-$C_1$-$C_{10}$ alkylene-$CO_2R_4$, and $C_1$-$C_{10}$ alkylene cyclohexylene-$C_1$-$C_{10}$ alkylene-OH, wherein $R^4$ is hydrogen or $C_1$-$C_6$ alkyl.

38. The polyester composition of claim 30 wherein $R^1$ is hydrogen, $C_1$-$C_{10}$ alkyl, $C_3$-$C_{10}$ cycloalkyl, or phenyl.

39. A formed article comprising the polyester composition of claim 1.

* * * * *